(12) United States Patent
Sun

(10) Patent No.: US 11,148,802 B1
(45) Date of Patent: Oct. 19, 2021

(54) ROBUST COOPERATIVE LOCALIZATION AND NAVIGATION OF TETHERED HETEROGENEOUS AUTONOMOUS UNMANNED VEHICLES IN RESOURCE-CONSTRAINED ENVIRONMENTS

(71) Applicant: Arrowhead Center, Inc., Las Cruces, NM (US)

(72) Inventor: Liang Sun, El Paso, TX (US)

(73) Assignee: Arrowhead Center, Inc., Las Cruces, NM (US)

(*) Notice: Subject to any disclaimer, the term of this patent is extended or adjusted under 35 U.S.C. 154(b) by 609 days.

(21) Appl. No.: 16/016,509

(22) Filed: Jun. 22, 2018

Related U.S. Application Data

(60) Provisional application No. 62/523,692, filed on Jun. 22, 2017.

(51) Int. Cl.
| | | |
|---|---|---|
| *B64C 39/02* | (2006.01) | |
| *B64F 3/02* | (2006.01) | |
| *B64F 1/00* | (2006.01) | |
| *B66D 1/50* | (2006.01) | |
| *B66D 1/60* | (2006.01) | |

(52) U.S. Cl.
CPC .......... *B64C 39/024* (2013.01); *B64C 39/022* (2013.01); *B64F 1/007* (2013.01); *B64F 3/02* (2013.01); *B66D 1/505* (2013.01); *B66D 1/60* (2013.01); *B64C 2201/024* (2013.01); *B64C 2201/06* (2013.01); *B64C 2201/148* (2013.01); *B64C 2201/208* (2013.01)

(58) Field of Classification Search
CPC ..... B64C 39/024; B64C 39/022; B64F 1/007; B64F 3/02; B66D 1/505; B66D 1/60
See application file for complete search history.

(56) References Cited

U.S. PATENT DOCUMENTS

| | | |
|---|---|---|
| 7,510,142 B2 | 3/2009 | Johnson |
| 7,543,780 B1 | 6/2009 | Marshall et al. |
| 7,631,834 B1 | 12/2009 | Johnson et al. |

(Continued)

FOREIGN PATENT DOCUMENTS

| | | |
|---|---|---|
| CN | 106992609 | 7/2017 |
| KR | 20180031622 | 3/2018 |
| WO | 2016137982 | 9/2016 |

OTHER PUBLICATIONS

Cyphy Works, "The Future of High-Powered Commercial Drones", http://cyphyworks.com/ (downloaded Sep. 29, 2016).

(Continued)

*Primary Examiner* — Justin M Benedik
(74) *Attorney, Agent, or Firm* — Peacock Law P.C.; Justin R. Jackson; Deborah A. Peacock

(57) ABSTRACT

A self-localization method and system to estimate the position of a tethered quadcopter using only the onboard sensors. Embodiments of the invention are based on the dynamics of the tethered quadcopter and the principles of an accelerometer. The estimated orientation angles of the tether were used to estimate the location of the quadcopter with respect to the connecting point of the tether, which can be a ground vehicle. The results generated by both the software simulation and actual experiments reveal the effectiveness and accuracy of embodiments of the present invention.

18 Claims, 16 Drawing Sheets

(56) References Cited

U.S. PATENT DOCUMENTS

| | | | |
|---|---|---|---|
| 8,930,044 | B1 | 1/2015 | Peeters et al. |
| 9,302,770 | B2 | 4/2016 | Burgess et al. |
| 2006/0144994 | A1* | 7/2006 | Spirov ................. G05D 1/0816 244/62 |
| 2010/0013236 | A1* | 1/2010 | Carroll .................... F03D 3/005 290/55 |
| 2012/0150364 | A1 | 6/2012 | Tillotson et al. |
| 2015/0336669 | A1 | 11/2015 | Kantor et al. |
| 2015/0350914 | A1 | 12/2015 | Baxley et al. |
| 2017/0008626 | A1* | 1/2017 | Walker ................. B64C 39/022 |
| 2017/0285627 | A1 | 10/2017 | Feldmann et al. |
| 2018/0009527 | A1 | 1/2018 | Von Novak, III et al. |
| 2018/0039286 | A1* | 2/2018 | Tirpak ...................... B64F 1/00 |
| 2018/0107209 | A1 | 4/2018 | Hardee et al. |

OTHER PUBLICATIONS

Mittleider, Andrew, et al., "Experimental Analysis of a UAV-Based Wireless Power Transfer System", Experimental Robotics: The 14th International Symposium on Experimental Robotics (pp. 357-371), Jan. 1, 2016.

Tognon, Marco, et al., "Observer-Based Control of Position and Tension for an Aerial Robot Tethered to a Moving Platform", IEEE Robotics and Automation Letters, vol. 1, pp. 732-737, Jul. 2016.

* cited by examiner

ROBUST COOPERATIVE LOCALIZATION AND NAVIGATION OF TETHERED HETEROGENEOUS AUTONOMOUS UNMANNED VEHICLES IN RESOURCE-CONSTRAINED ENVIRONMENTS

CROSS-REFERENCE TO RELATED APPLICATIONS

This application claims priority to and the benefit of the filing of U.S. Provisional Patent Application No. 62/523,692, entitled "ROBUST COOPERATIVE LOCALIZATION AND NAVIGATION OF TETHERED HETEROGENOUS AUTONOMOUS UNMANNED VEHICLES IN RESOURCE-CONSTRAINED ENVIRONMENTS", filed on Jun. 22, 2017, and the specification thereof is incorporated herein by reference.

STATEMENT REGARDING FEDERALLY SPONSORED RESEARCH OR DEVELOPMENT

Not Applicable.

BACKGROUND OF THE INVENTION

Field of the Invention (Technical Field)

Embodiments of the present invention relate to a novel Tethered Heterogeneous Unmanned System (THUS) for Cooperative Localization and Navigation (CLaN) in resourced-constrained environments. More particularly, embodiments of the present invention relate to aerial and ground vehicles physically connected by a tether of varying length, which can provide robust relative position information for localization, free up the resource for inter-localization, and offer persistent and secured data transmission link and electricity power to the aerial vehicle.

Description of Related Art

The early scientific study of tethered systems can be dated back to D. Bernoulli (1700-1782) and L. Euler (1707-1783), who studied the linearized solutions of the nonlinear dynamical equations and conducted an eigenvalue analysis on a tethered system. Starting in the 20th century, the study and investigation of tethered systems can be categorized into stability and equilibrium analysis, dynamics modeling, and control and estimation. Commercial tethered unmanned aerial vehicle (UAV) platforms have also emerged on the market recently.

Although others have attempted to describe the dynamics of a tether length and applied torque, those attempts were based on the assumption that the mobile platform is an independent subsystem whose motion is not influenced by the aerial vehicle dynamics and whose motion can only be measured online. This ignores the cooperative nature of the THUS. The control strategy of such previous attempts did not consider the effect of the prop wash on the tether.

The remaining research problems of THUS that have not been well-addressed include (1) the integrated dynamics of THUS that treat the UAV, the unmanned ground vehicle (UGV), and the tether as a single system; (2) estimation and control strategies for attitude and trajectory tracking; (3) the relationship between the winch dynamics and the dynamic envelope of the UAV, in the sense that the limitation of the UAV's motion is dictated by the winch dynamics; and (4) the effect of the rotor prop wash and the wind gust on the tether.

Localization and navigation (LaN), as the baseline capabilities of unmanned vehicles (UVs), support both civilian and military applications, for example search and rescue, disaster assessment and management, law enforcement, border surveillance, and monitoring civilian infrastructure.

Global Positioning Systems (GPS) provide a most convenient mechanism for LaN of UVs. However, GPS suffers disadvantages that render it unsuitable as an exclusive localization sensor. Primarily, GPS is subject to varied accuracy and availability. Satellite signals may be degraded by natural and artificial interference, for example occlusions and jamming. It is also subject to electromagnetic interference from communications, processing and power electronic devices or to corruption by multi-path reflections.

In resource-constrained environments, for example no prior global map, GPS-denied, and sparse landmarks, the robustness of LaN relies on the sensing capability of unmanned vehicles (UVs). The majority of available sensors are based on infrared detectors, focal plane arrays, optical and ultrasonic rangefinders, and video cameras. These sensors are generally limited in sensing range and field of view. Cameras and other optical systems are often adversely affected by changing sunlight conditions and other environmental factors (e.g., smoke, fog, dust), limiting their ability to detect other vehicles/objects. Furthermore, when detection is possible, identification and differentiation using such systems tend to be computationally expensive for onboard computing. It is also communicationally intensive for cloud/remote computing at least partly because the optical signals must be processed extensively to derive target type information.

A heterogeneous UV team (e.g., a quadcopter and a ground robot) can integrate the sensing capabilities of individual systems, and it can provide UVs with CLaN functions of enhanced accuracy and robustness. However, such cooperation is based on wireless communication and inter-localization using visual sensors or rangefinders, both of which suffer from interference and obstruction, occupy UV's limited sensing and communication resources, and largely diminish the mobility and efficiency of the system.

Several research papers have recently addressed the cooperation between UAVs and UGVs and tethered quadcopters, in that heterogeneous unmanned vehicles (HUVs) share and integrate their sensing information to provide enhanced localization and navigation capabilities. In spite of that, conventional wireless communication between UAVs and UGVs suffers from drawbacks, for example high-power consumption, interference, and signal blockage.

Small quadcopter UAVs are gaining more and more popularity and growth in civil applications, for example monitoring, agriculture, and aerial photography. Recently, many well-known private companies have adopted quadcopters in their business, for example commercial delivery of goods, packages, food, and products. Quadcopters usually rely on onboard sensors to navigate through pre-defined waypoints and paths, for example GPS systems for outdoor applications (differential GPS), infrared (IR) sensors, laser rangefinders, and optical and vision systems.

Unfortunately, the aforementioned sensors may not always be available or of a satisfactory resolution. Moreover, they suffer drawbacks like low bandwidth, unavailability due to natural and artificial interference, and limitations in the sensing range and the field of view, as well as their limited payload. All of these shortcomings keep the inertial sensors as an essential resource for stabilization and localization.

The problem with known tethered drones are that they are expected to hover at a fixed aerial location and do not come with solutions to achieve CLaN in resource-constrained environments. There is thus a present need for an apparatus, method and system that provides UVs with robust, accurate, persistent and secured LaN capabilities in resource-constrained environments—particularly UVs which are adapted to roam about resource-constrained environments. There is also a present need for an apparatus, method and system that provides high bandwidth, improved sensing range and field of view as well as increased payload. There is also a present need for a method, apparatus and system which permits interaction between a UAV and a UGV in the presence of a tether connection.

Still further, in a GPS-denied environment, simultaneous localization and mapping (SLAM) techniques have been attempted where Kalman filters were used to estimate the location of the UV relative to landmarks. Cooperative SLAM (C-SLAM) using heterogeneous sensors, which incorporate data fusion technique to increase the accuracy of localization has also been attempted. However, C-SLAM using heterogeneous unmanned vehicles has not been studied. There is thus a present need for a cooperative localization system of THUS.

BRIEF SUMMARY OF THE INVENTION

An embodiment of the present invention relates to an unmanned aerial vehicle system having an unmanned ground vehicle (UGV), a sensing unmanned aerial vehicle (UAV), a tether configured to couple the UAV and the UGV, the tether configured to transmit data from the UAV to the UGV, and a tether position sensing system. The sensing unmanned aerial vehicle can comprise an unmanned aerial vehicle having one or more sensors, which can include but are not limited to one or more cameras. In the unmanned aerial vehicle system, the tether is preferably taut while the UGV and the UAV are connected with the tether.

The tether position sensing system can include a sensor that is configured to measure an angle formed between the tether and the UGV. The tether position sensing system can also be configured to determine a position of the UAV with respect to the UGV based at least in part on a length of the tether and on an output of the sensor. The tether can be configured to function as a secure data link between the UGV and the UAV. The tether can be configured to provide power to the UAV. In one embodiment, the UVA can be a vertical takeoff and landing (VTOL) aircraft. Optionally, the UGV can include a landing platform. The unmanned aerial vehicle system can include an electromagnetic rapid coupling system.

Optionally, the unmanned aerial vehicle system can include a smart winching system configured to provide controllable reeling of the tether, which can optionally be controlled based at least in part on current and desired positions, and/or based at least in part on velocity and attitude of the UAV. The unmanned aerial vehicle system can also include a collision protection system.

An embodiment of the present invention also relates to an unmanned aerial vehicle system including a station, the station having an unmanned ground vehicle (UGV) and/or a stationary station; an unmanned aerial vehicle (UAV); a tether configured to couple the UAV and the station and to transmit power and/or data; and a tether position sensing system configured to sense at least an angular position of the tether with respect to the station. The tether position sensing system can be configured to determine a position of the UAV with respect to the station based at least in part on a length of the tether and on the angular position of the tether with respect to the station. Optionally, a smart winching system can also be provided and can be configured to monitor a length of tether extending between the station and the UAV.

An embodiment of the present invention also relates to a method for providing aerial monitoring including providing power to an unmanned aerial vehicle (UAV) from a station via a retractable tether; electrically decoupling the UAV from the station and powering the UAV with electrical power stored on the UAV; reconnecting the UAV to the station or to a second station and transmitting data from the UAV while simultaneously providing power to the UAV in sufficient quantity to power the UAV and to recharge an electrical storage of the UAV.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

An embodiment of the present invention relates to a tethered-based quadcopter that provides robust, accurate, persistent and secured localization and navigation capabilities in resource-constrained environments where no prior information about the environment, location map or GPS signals are available.

Although the term "quadcopter" is sometimes referred to throughout this application, it is to be understood that it is used interchangeably with the terms "drone" and/or unmanned aerial vehicle (UAV) herein, and such terms include any other form of unmanned aerial flight vehicle. In one embodiment, the terms "quadcopter", "drone", and/or UAV do not include kite systems because the latter's motion is greatly dictated by wind conditions. As used throughout this application, the term "localization" is intended to mean both the identification of the THUS location with respect to an object and vice versa.

In one embodiment, a tether is used to connect the quadcopter to a platform on the ground. To render the mobility of the entire system, a UGV is preferably provided to work as a ground platform.

Figure 18:
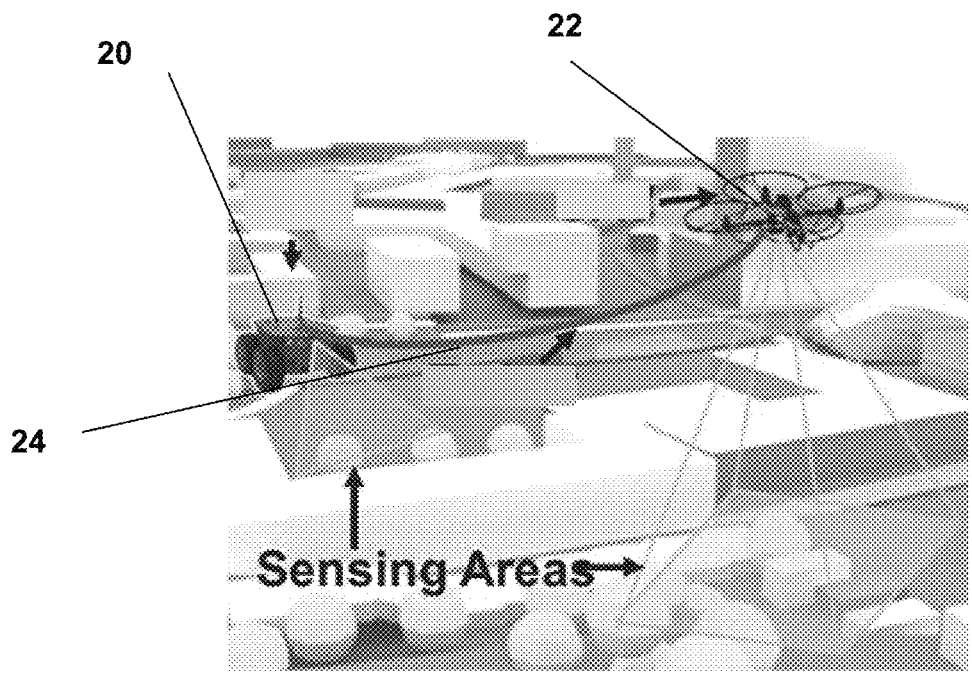
FIG. 18 is a drawing which illustrates a general concept of an embodiment of the present invention.

An embodiment of the present invention as best illustrated in FIG. 18 relates to a quadcopter 22 and a ground vehicle 20 physically connected by a taut tether 24, including but not limited to a taut tether having an adjustable length. The tethered system provides robust relative position information for localization, frees up the resource for inter-localization, and offers persistent and secured data transmission link and electricity power to the quadcopter. In this embodiment, the quadcopter and the ground vehicle are able to share their sensing information via the tether, which provides a secured data link. In one embodiment, the present invention can be used in applications that include but are not limited to Intelligence, Surveillance, and Reconnaissance (ISR), search and rescue, disaster assessment, and infrastructure monitoring, where GPS signals may not be available while precise operations are expected.

In one embodiment, the present invention can provide self-localization of a tethered quadcopter that only utilizes onboard sensors. The relative positions of the two vehicles are preferably calculated by using the length and angle information of the tether, thus removing the need for wireless communication and inter-sensing. The relative location information obtained using a taut tether is more accurate than using wireless visual cameras or rangefinders, which are subject to obstruction. In one embodiment, accelerometer measurements are preferably used to estimate the cable tension force exerted on the quadcopter based on first principles. The estimated acceleration induced by the cable is then used to calculate the relative position of the quadcopter with respect to the ground vehicle.

The inertial frame $\mathcal{F}^i$. The inertial coordinate system is an Earth-fixed coordinate system with its origin at a predefined location. This coordinate system is herein referred to as the North-East-Down (NED) reference frame. It is common for North to be referred to as the inertial x direction, East to the y direction, and Down to the z direction.

The vehicle frame $\mathcal{F}^v$. In one embodiment, the origin of the vehicle frame is at the center of mass of a quadcopter. However, the axes of $\mathcal{F}^v$ are aligned with the axes of the inertial frame $\mathcal{F}^i$. In other words, the unit vector i" points toward North, j" toward East, and k" toward the center of the Earth.

The vehicle-1 frame $\mathcal{F}^{v1}$. In one embodiment, the origin of the vehicle-1 frame is identical to the vehicle frame. However, $\mathcal{F}^{v1}$ is rotated in a positive right-handed direction about k" by the heading (or yaw) angle, $\psi$. The transformation from $\mathcal{F}^v$ to $\mathcal{F}^{v1}$ is given by $$p^{v1} = R_v^{v1}(\psi) p^v,$$

Where $$R_v^{v1}(\psi) = \begin{pmatrix} \cos\psi & \sin\psi & 0 \\ -\sin\psi & \cos\psi & 0 \\ 0 & 0 & 1 \end{pmatrix}$$

The vehicle-2 frame $\mathcal{F}^{v2}$. In one embodiment, the origin of the vehicle-2 frame is again the center of mass of the quadcopter and is obtained by rotating the vehicle-1 frame in a right-handed rotation about the $j^{v1}$ axis by the pitch angle, $\theta$. The transformation from $\mathcal{F}^{v1}$ to $\mathcal{F}^{v2}$ is given by $$p^{v2} = R_{v1}^{v2}(\theta) p^{v1},$$

Where $$R_{v1}^{v2}(\theta) = \begin{pmatrix} \cos\theta & 0 & -\sin\theta \\ 0 & 1 & 0 \\ \sin\theta & 0 & \cos\theta \end{pmatrix}$$

The body frame (vehicle-3 frame) $\mathcal{F}^b$. In one embodiment, the body frame is obtained by rotating the vehicle-2 frame in a right-handed rotation about $i^{v2}$ by the roll angle, $\phi$. The transformation from $\mathcal{F}^{v2}$ to $\mathcal{F}^b$ is given by $$p^b = R_{v2}^b(\phi) p^{v2},$$

Where $$R_{v2}^b(\phi) = \begin{pmatrix} 1 & 0 & 0 \\ 0 & \cos\theta & -\sin\theta \\ 0 & -\sin\theta & \cos\theta \end{pmatrix}$$

Figure 1:
FIG. 1 is a photo which illustrates a quadcopter as is known in the prior art.
Figure 2:
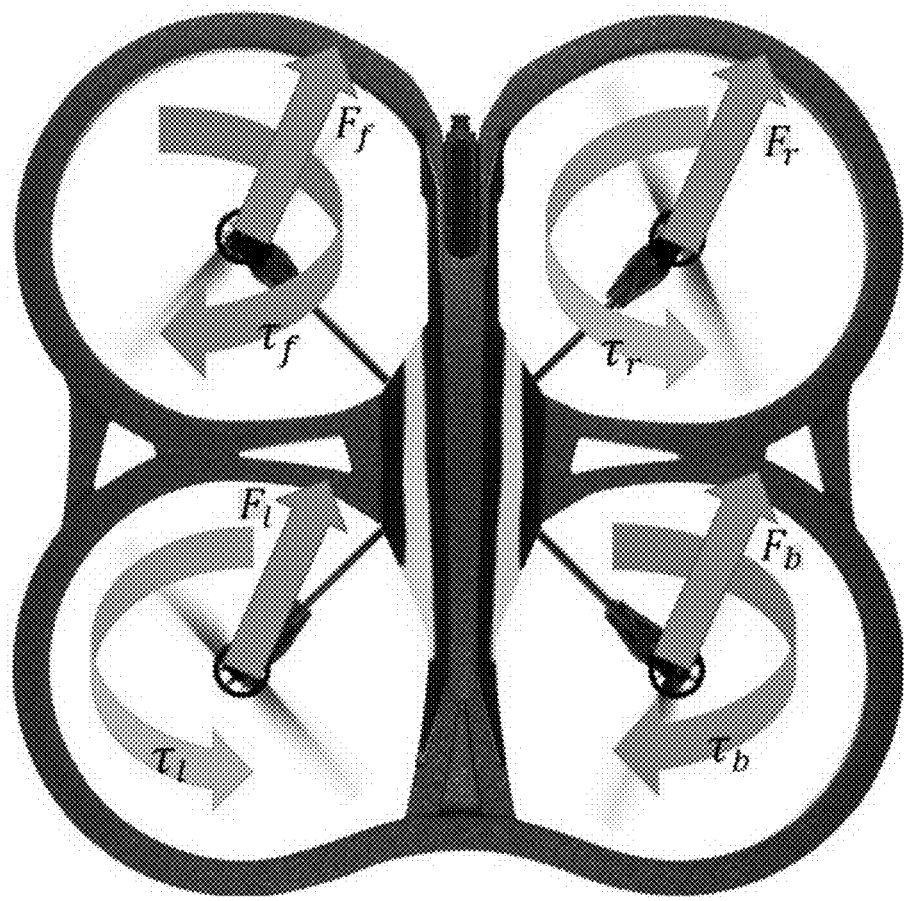
FIG. 2 illustrates the directions of spin and thrust forces of the various propellers of the known quadcopter.

In one embodiment, a quadcopter is an aerial vehicle that comprises a plurality of rotors that consist of a frame that is symmetrically arranged with four similar counter rotating motors for vertical takeoff and landing, as illustrated in FIG. 1. In this embodiment, as FIG. 2 illustrates, the front and back motors rotate clockwise while the right and left ones rotate counterclockwise. This arrangement cancels out the rotation tendency along the z-axis. To make a yaw motion, opposite pairs of motors slow down relative to the other pair.

In one embodiment, a forward flight (or rotating clockwise around the pitch axis, as illustrated in FIG. 1) is achieved by spinning the two motors on the back side faster than those in the front, thus making the quadcopter pitch down. The opposite strategy applies for backward flight. Similarly, to make the quadcopter fly to the right (or rotate clockwise about the roll-axis, as illustrated in FIG. 1), the two motors on the left spin faster than those on the right, causing the left side to have more lift force than the right. To hover or land the quadcopter, the motors counteract the gravity force with the lift generated by the motors. Thus, if the total thrust generated by the motors is equal to the gravity force, the quadcopter will stay at a fixed altitude. Similarly, to change the altitude (up or down), the motors spin faster to generate larger lift force.

The six degrees of freedom model for quadcopter kinematics and the dynamics of 12 states are presented as follows.

$$\begin{pmatrix} \dot{p}_n \\ \dot{p}_e \\ \dot{p}_d \end{pmatrix} = \begin{pmatrix} c_\theta c_\psi & s_\phi s_\theta c_\psi - c_\phi s_\psi & c_\phi s_\theta c_\psi + s_\phi s_\psi \\ c_\theta s_\psi & s_\phi s_\theta s_\psi + c_\phi c_\psi & c_\phi s_\theta s_\psi - s_\phi c_\psi \\ -s_\theta & s_\phi c_\theta & c_\phi c_\theta \end{pmatrix},$$ (Equation 1)

$$\begin{pmatrix} \dot{u} \\ \dot{v} \\ \dot{w} \end{pmatrix} = \begin{pmatrix} rv - qw \\ pw - ru \\ qu - pv \end{pmatrix} + \frac{1}{m}\begin{pmatrix} f_x \\ f_y \\ f_z \end{pmatrix},$$ (Equation 2)

$$\begin{pmatrix} \dot{\phi} \\ \dot{\theta} \\ \dot{\psi} \end{pmatrix} = \begin{pmatrix} 1 & \sin\phi\tan\theta & \cos\phi\tan\theta \\ 0 & \cos\phi & -\sin\phi \\ 0 & \frac{\sin\phi}{\cos\theta} & \frac{\cos\phi}{\cos\theta} \end{pmatrix}\begin{pmatrix} p \\ q \\ r \end{pmatrix},$$ (Equation 3)

$$\begin{pmatrix} \dot{p} \\ \dot{q} \\ \dot{r} \end{pmatrix} = \begin{pmatrix} \Gamma_1 pq - \Gamma_2 qr \\ \Gamma_5 pr - \Gamma_6(p^2 - r^2) \\ \Gamma_7 pq - \Gamma_1 qr \end{pmatrix} + \begin{pmatrix} \Gamma_3 \tau_l + \Gamma_4 \tau_n \\ \frac{1}{J_y}\tau_m \\ \end{pmatrix},$$ (Equation 4)

where $p_u \triangleq (p_n, p_e, p_d)^t \in \mathbb{R}^3$ is defined as the quadcopter position in the North-East-Down (NED) inertial frame, (u, v, w) is the vehicle velocity vector in the body frame, m is the vehicle mass, (p, q, r) is the rotational velocity in the body frame, and $(f_x, f_y, f_z)$, $(\tau_l, \tau_m, \tau_n)$ are the total external forces and moments applied to the quadcopter in the body frame respectively. Parameters $\Gamma_*$ are given by $$\Gamma_1 = \left(\frac{J_{xz}(J_x - J_y + J_z)}{\Gamma}\right)$$ (Equation 5)

$$\Gamma_2 = \left(\frac{J_z(J_z - J_y) + J_{xz}^2}{\Gamma}\right)$$ (Equation 6)

-continued $$\Gamma_3 = \frac{J_z}{\Gamma}$$ (Equation 7)

$$\Gamma_4 = \frac{J_{xz}}{\Gamma}$$ (Equation 8)

$$\Gamma_5 = \frac{J_z - J_x}{J_y}$$ (Equation 9)

$$\Gamma_6 = \frac{J_{xz}}{J_y}$$ (Equation 10)

$$\Gamma_7 = \left(\frac{(J_x - J_y)J_x + J_{xz}^2}{\Gamma}\right)$$ (Equation 11)

$$\Gamma_8 = \frac{J_x}{\Gamma}$$ (Equation 12)

$$\Gamma = J_x J_z - J_{xy}^2$$ (Equation 13)

where $J_x$, $J_y$, and $J_z$ are moments of inertia of the quadcopter.

A quadcopter is usually equipped with an inertial measurement unit (IMU) that consists of a triaxial accelerometer and gyroscopes. The accelerometer and gyroscopes measure the acceleration and angular velocity respectively projected onto its coordinate axes in the body frame. It is worthy to note that in one embodiment, the accelerometer does not sense the overall acceleration but rather the non-gravitational acceleration. In other words, it measures the difference between the overall acceleration of the vehicle and the gravitational acceleration.

By applying the Newton's second law to the tethered quadcopter, we get:

$$\Sigma F_T = ma$$ (Equation 14)

where $F_T$ is the applied forces and a is the acceleration. For quadcopters, the aerodynamic forces can be neglected because of the absence of the conventional aerodynamic lifting wing surfaces. Thus, the applied forces for a tethered quadcopter consist of the thrust generated by the four propellers, the gravity, and the cable tension.

The output of a 3-axis accelerometer along the body frame of a quadcopter is given by $$\begin{pmatrix} a_x \\ a_y \\ a_z \end{pmatrix} = \frac{1}{m}(F_T - F_{gravity})$$ (Equation 15)

$$= \dot{V} + \varpi_{b/i}^b \times V - \frac{1}{m}F_{gravity}$$ (Equation 16)

Expanding Equation (16) into its components along the body axes gives $$a_x = \dot{u} + qw - rv + g\sin\theta$$ Equation 17)

$$a_y = \dot{v} + ru - pw - g\cos\theta\sin\phi$$ Equation 18)

$$a_z = \dot{w} + pv - qu - g\cos\theta\cos\phi$$ (Equation 19)

Assuming that the biases can be removed through the calibration process, the accelerometer signals inside the autopilot can be modeled as $$y_{acc,x} = \dot{u} + qw - rv + g\sin\theta + \eta_{acc,x}$$ (Equation 20)

$$y_{acc,y} = \dot{v} + ru - pw - g\cos\theta\sin\phi + \eta_{acc,y}$$ (Equation 21)

$$y_{acc,z} = \dot{w} + pv - qu - g\cos\theta\cos\phi + \eta_{acc,z}$$ (Equation 22)

where $\eta_{acc,x}$, $\eta_{acc,y}$, and $\eta_{acc,z}$ are zero mean Gaussian processes with variance $\sigma_{acc,x}^2$, $\sigma_{acc,y}^2$, and $\sigma_{acc,z}^2$, respectively, and the units of $y_{acc,x}$, $y_{acc,y}$, and $y_{acc,z}$ are in m/s². As the accelerometer output is usually expressed in units of g, the actual readings of an accelerometer are the results of the equations (20)-(22) divided by g.

Figure 3:
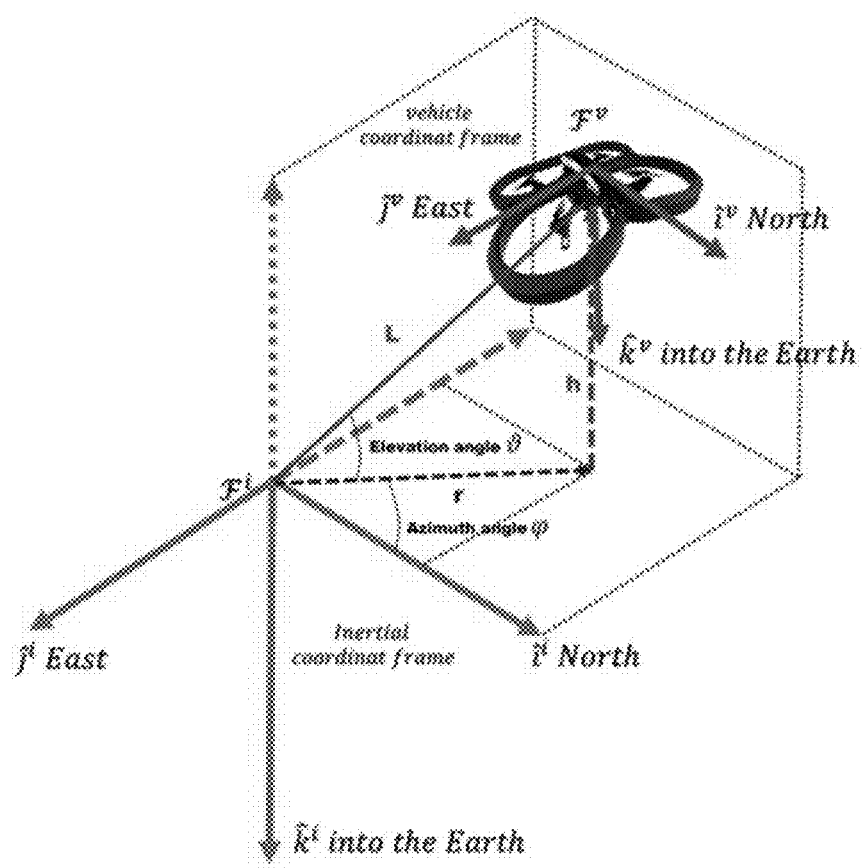
FIG. 3 is a diagram which illustrates quadcopter position and orientation defined in a spherical frame.

The accelerometer measurements as previously described provide the external forces applied to the quadcopter. The external forces include the thrust force and any other external forces applied, whose major component is the one exerted by the taut tether for a tethered quadcopter. In one embodiment, the quadcopter position can be estimated with respect to a reference point on another vehicle, i.e., a vehicle connected to the other end of the tether. The quadcopter position is preferably characterized in a spherical frame, as illustrated in FIG. 3. The position of the cable (L) connecting the UAV with the origin is preferably parameterized using two orientation angles, i.e., the elevation angle, $\vartheta \in [0,\pi]$, which is defined as the angle between the cable (L) and its projection onto the (x-y) horizontal plane while the azimuth angle, $\phi \in [-\pi,\pi]$, is defined as the angle between the projection of L (r) on the (x-y) horizontal plane and the (x-z) vertical plane.

Because the thrust forces can be calculated using the pulse width modulation (PWM) signals commanded to the motors, the remaining tether force exerted on the quadcopter can be estimated using the cable length (l) or the altitude (h) of the quadcopter, assuming that the total thrust force is large enough to keep the cable taut. The magnitude of the cable force (tension) as well as its elevation and azimuth angles are preferably found. The described cable force and other variables are illustrated in FIG. 3.

The spinning speed of motors of a quadcopter are typically proportional to the PWM commands sent to the motors. The thrust force of each motor can be expressed as a function of motor PWM commands.

$$\begin{pmatrix} F_f \\ F_r \\ F_b \\ F_l \end{pmatrix} = \begin{pmatrix} 1.56 \cdot 10^{-4} \delta_f^2 + 1.03 \cdot 10^{-2} \delta_f + 0.138 \\ 1.81 \cdot 10^{-4} \delta_r^2 + 8.72 \cdot 10^{-3} \delta_r + 0.144 \\ 1.34 \cdot 10^{-4} \delta_b^2 + 7.32 \cdot 10^{-3} \delta_b + 0.116 \\ 1.43 \cdot 10^{-4} \delta_l^2 + 5.76 \cdot 10^{-3} \delta_l + 0.133 \end{pmatrix} \quad \text{(Equation 23)}$$

where the subscripts [f, r, b, l] denote the [front, right, back, left] motors respectively, as illustrated in FIG. 2, and $\delta_*$ denotes the motor PWM command whose value ranges [0-100].

The sum of the motor forces (thrust force) is given by $$F = F_f + F_r + F_b + F_l \quad \text{(Equation 24)}$$

The thrust forces (in the body frame) acting on the quadcopter can be written in a vector form as $$\begin{pmatrix} F_{thrust,x} \\ F_{thrust,y} \\ F_{thrust,z} \end{pmatrix} = \begin{pmatrix} 0 \\ 0 \\ -(F_f + F_r + F_b + F_l) \end{pmatrix} \quad \text{(Equation 25)}$$

Then, the cable tension forces can be calculated by $$\begin{pmatrix} F_{cable,x} \\ F_{cable,y} \\ F_{cable,z} \end{pmatrix} = \begin{pmatrix} ma_x \\ ma_y \\ ma_z \end{pmatrix} - \begin{pmatrix} F_{thrust,x} \\ F_{thrust,y} \\ F_{thrust,z} \end{pmatrix} \quad \text{(Equation 26)}$$

The 3D cable tension forces are then used to calculate the two orientation angles of the cable, i.e., the azimuth angle $\varphi$ and the elevation angle $\vartheta$, which are given by $$\varphi = a\tan 2(F_{cable,y}, F_{cable,x}) \quad \text{(Equation 27)}$$

$$\vartheta = a\tan 2\left(F_{cable,z}, \sqrt{F_{cable,x}^2 + F_{cable,y}^2}\right) \quad \text{(Equation 28)}$$

Then, these two angles, with the cable length, are used to find the position of the quadcopter with respect to the base point of the cable (i.e. the ground vehicle) as $$p_n = l \cdot \cos(\vartheta) \cdot \cos(\varphi) \quad \text{(Equation 29)}$$

$$p_e = l \cdot \cos(\vartheta) \cdot \cos(\varphi) \quad \text{(Equation 30)}$$

$$p_d = l \cdot \sin(\varphi) \quad \text{(Equation 31)}$$

FIG. 18 illustrates a baseline concept of an embodiment of the present invention wherein a THUS is navigating in an unknown, GPS-denied and obstacle-rich environment. This embodiment preferably comprises an aerial towing vehicle (quadcopter), which is most preferably a vertical takeoff and landing (VTOL) aircraft, a mobile base, a ground robot, and a tether that physically connects the two UVs. The sensing areas of the two UVs are illustrated by polygons. One embodiment of the present invention assumes that one end of the tether is either connected to a passive object, as would be the case for surveillance using an aerostat, or mounted on a stationary station, as would be the case for tether-guided stabilization/landing.

In this baseline scenario, while the quadcopter and ground robot are sensing different zones in the unknown space, their knowledge is shared via the tether, which preferably remains taut. The tether provides a secured data link. A stitched local map is preferably generated quickly for the purpose of navigation (e.g., obstacle avoidance and path planning). The relative positions of the two UVs are preferably calculated by using the tether length and angle information, removing the need for wireless communication and inter-sensing. The relative location information obtained using a taut tether in nature is more accurate than using wireless visual cameras or rangefinders, which are subject to obstruction. When the two UVs are moving, the tether length can preferably be adjusted by retracting it with a winch that also controls the tether tautness. To prevent the tether from colliding with obstacles, 3D spatial constraints are preferably provided in the obstacle avoidance and path planning algorithms. Embodiments of the present invention can provide desirable results in applications that can include Intelligence, Surveillance, and Reconnaissance (ISR), search and rescue, disaster assessment, and infrastructure monitoring, where GPS signals may not be available while precise operations are expected.

Fixed-wing Unmanned Aircraft Systems (UASs) can also be used in a THUS while a particular flight orbit around the ground robot is preferably maintained, thus maintaining its airspeed while keeping the tether within its range limit. Winch control and localization are also preferably provided to compensate the motion constraints of fixed-wing UAS on the THUS.

Tether weight is preferably taken into consideration—particularly when the tether length reaches a considerable level. Energy for the drone can also be carried on a ground vehicle and provided to the drone through the tether.

In one embodiment, a retractable cord, for example a retractable dog leash, can be used as a basis for the tether system. In one embodiment, a digital encoder is preferably used to measure the tether length.

Dynamics modeling for any particular UV combination is preferably performed to produce a mathematical representation of the system motion, which can then be used to derive control strategies for the attitude control, state estimation, trajectory tracking and path planning for that particular UV combination. In one embodiment, the control systems of THUS are dictated by the commands from a high-level CLaN manager.

Bi-directional cooperation refers to the switchable ability of each UV to guide the other vehicle in different situations (e.g., the quadcopter is able to guide the ground robot to avoid ground obstacles which are beyond the sensing range of the ground robot, while the ground robot is able to guide the quadcopter to pass over a bridge, which cannot be "seen" by the quadcopter). In one embodiment, tether-based localization approaches are preferably used to generate relative locations of UVs with respect to common coordinate frames. The tether angle information is preferably obtained using the estimation technique previously discussed. Three-dimensional (3D) path planning algorithms are preferably provided that incorporate the spatial location of the tether as well as the locations of the UVs. Collision-free paths are preferably generated based on the mathematical representation as previously discussed. A local map is assumed to be available via a real-time online mapping process. 3D reactive obstacle avoidance strategies are preferably provided to accommodate unexpected obstacles that were not previously indicated on the map.

Because in one embodiment, the THUS is preferably used to provide location information for the UAV through the tether, a winch is preferably provided to control the tautness and the applied length of the tether. For some embodiments, wherein a model of a curved tether is desired for a particular application, a discrete model of the tether can be modeled as $N(<\infty)$, rigid links connected by non-friction joints, and the number of tether links can be determined by the tether length.

It is important to obtain reliable localization information in a GPS-denied environment. To determine location of the quadcopter with respect to the UGV, the tether length and tether angles with respect to the UGV's vehicle frame are preferably determined. Although the tether attitude can be measured by using tether-angle sensors, estimation techniques (for example Kalman filters) are useful to deal with the measurement uncertainty, for example unmodeled disturbances and sensor noise.

Figure 22:
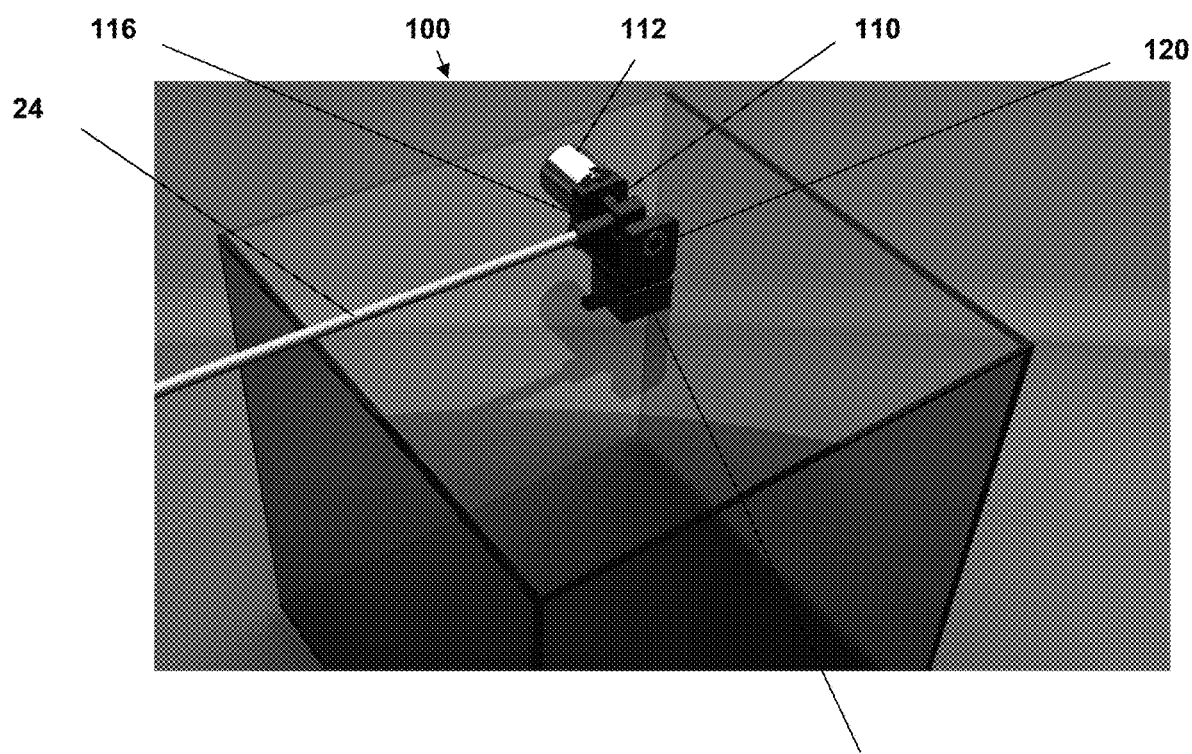
FIGS. 22 and 23 are drawings which respectively illustrate an elevated perspective view and an exploded view of a tether angle sensor of an embodiment of the present invention.
Figure 23:
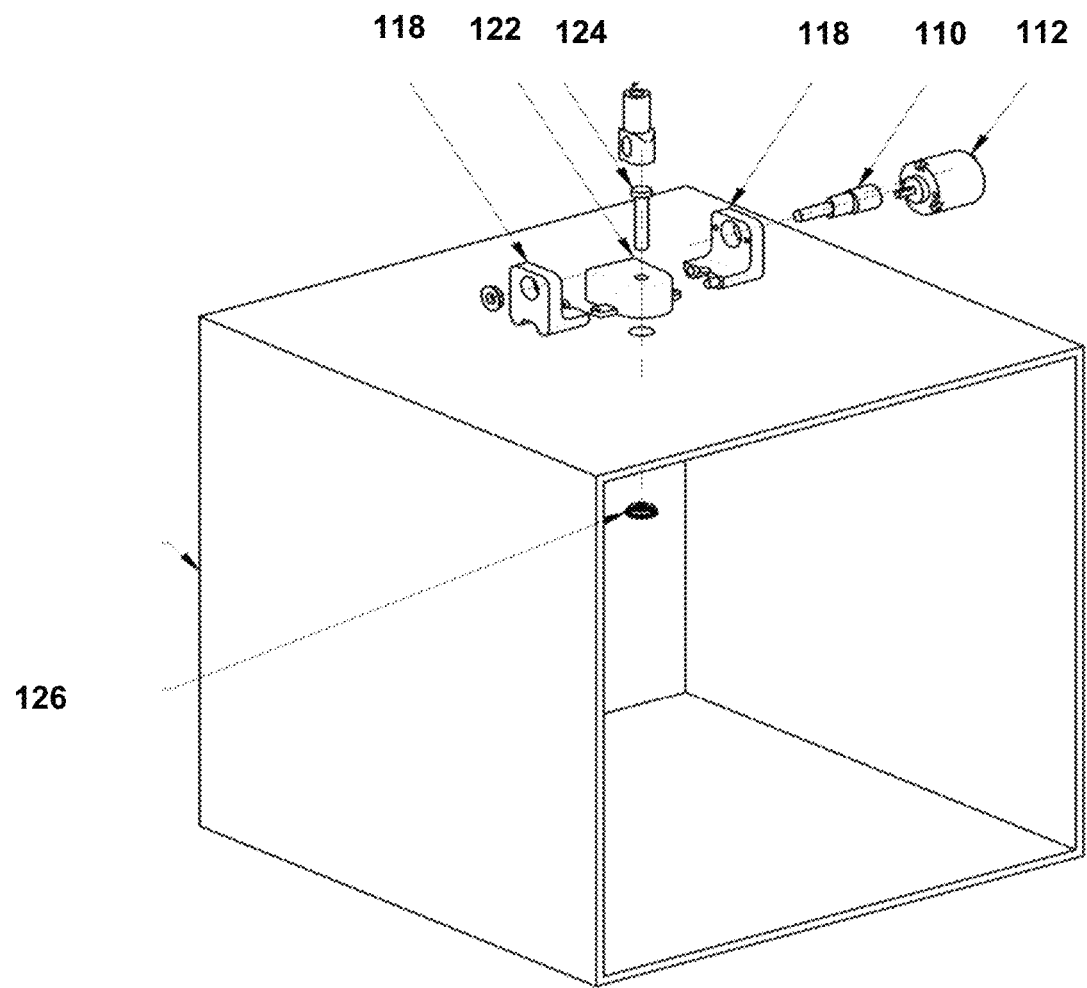

In one embodiment, a tether position sensing system is used to identify the orientation and the length of the tether in relation to the UAV. Referring to FIGS. 22-23, in one embodiment, a tether position sensing system comprises tether-angle sensor 100. In one embodiment, tether-angle sensor 100 comprises three axis magnetometer 110 coupled to encoder 112 and attached to tether 24 through tether connector 116. In one embodiment, tether-angle sensor 100 can comprise any sensor, apparatus, or system capable of measuring or estimating an angular position or orientation of the tether with respect to a ground vehicle. In one embodiment, two halves 118 are joined to form mounting bracket 120 for the assembly, which is in turn spinably connected to fixed line driver 122 with, for example, rotating pin 124. In one embodiment, rotating pin 124 is secured in place with, for example, flanged ball bearing 126.

In one embodiment, a collision protection system can be provided. The collision protection system is preferably configured to provide collision cushioning capability to permit the present invention to operate in a congested environment, for example in a tunnel for infrastructure inspection. The collision protection system can comprise a spherical shape, for example a cage. The tether is preferably taken into consideration in the configuration of the collision protection system to avoid the tether tangling with obstacles while providing protection from collision.

In one embodiment, the tether angle information is preferably obtained using the equipped onboard sensors (for example the IMU and inertial navigation system (INS)). In one embodiment, the observability analysis of THUS can be conducted to examine in which condition the tether orientation and tension force can be estimated using the UAV onboard sensory data. Next, conventional filtering techniques, for example, using an extended Kalman filter (EKF) and/or sigma-point Kalman filter (SPKF), are preferably used to estimate the system states. However, Kalman filters may not be able to produce reliable estimates for THUS, because of highly-nonlinear models with a large number of states, corrupted sensor readings, and asynchronous sampling. As such, optimization-based estimation techniques are preferably used, for example moving horizon estimation (MHE), to remedy such problems.

The control system of an embodiment of the present invention preferably has two main functions, to stabilize the quadcopter at a desired attitude, and to track a desired smooth three-dimensional trajectory. The ability to follow a desired attitude is desirable in order for embodiments of the present invention to be used in applications, for example infrastructure inspection (for example bridge inspections). It also provides an important capability to observe a desired area of the space in CLaN functions. Trajectory tracking capability of embodiments of the present invention are useful in applications, for example search and rescue, where the apparatus is expected to follow a pre-defined spatial path to maximize the probability of detecting lost people. It also provides the capability of following the collision-free path delivered from high-level path-planning functions.

Figure 19:
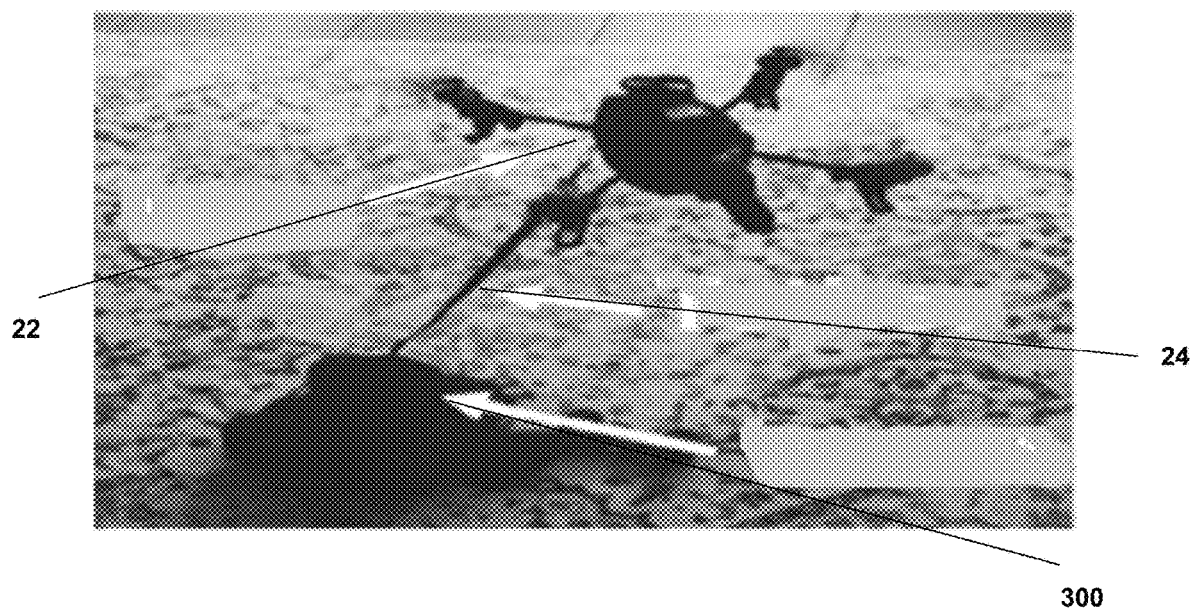
FIG. 19 illustrates an embodiment of the present invention which was constructed and tested.
Figure 20:
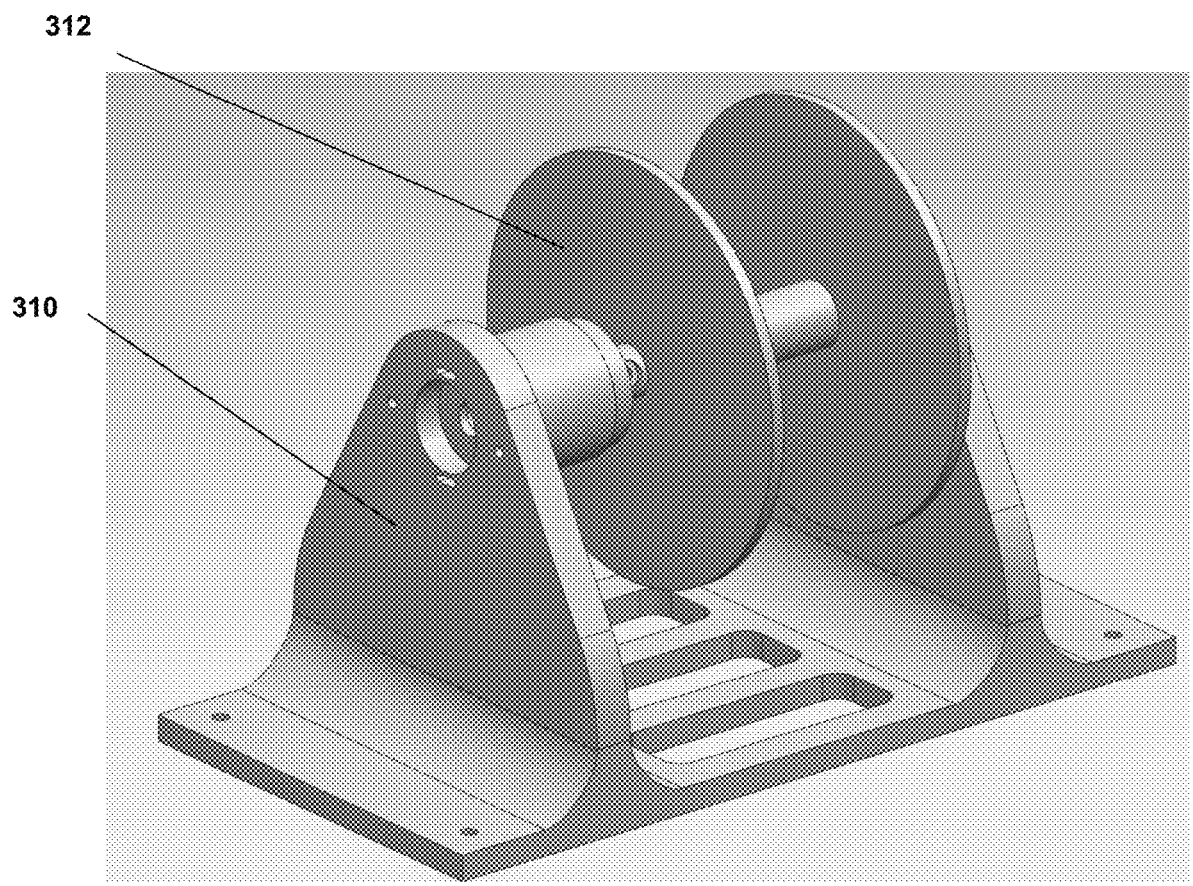
FIG. 20 is a drawing which illustrates a tether reel according to an embodiment of the present invention.
Figure 21:
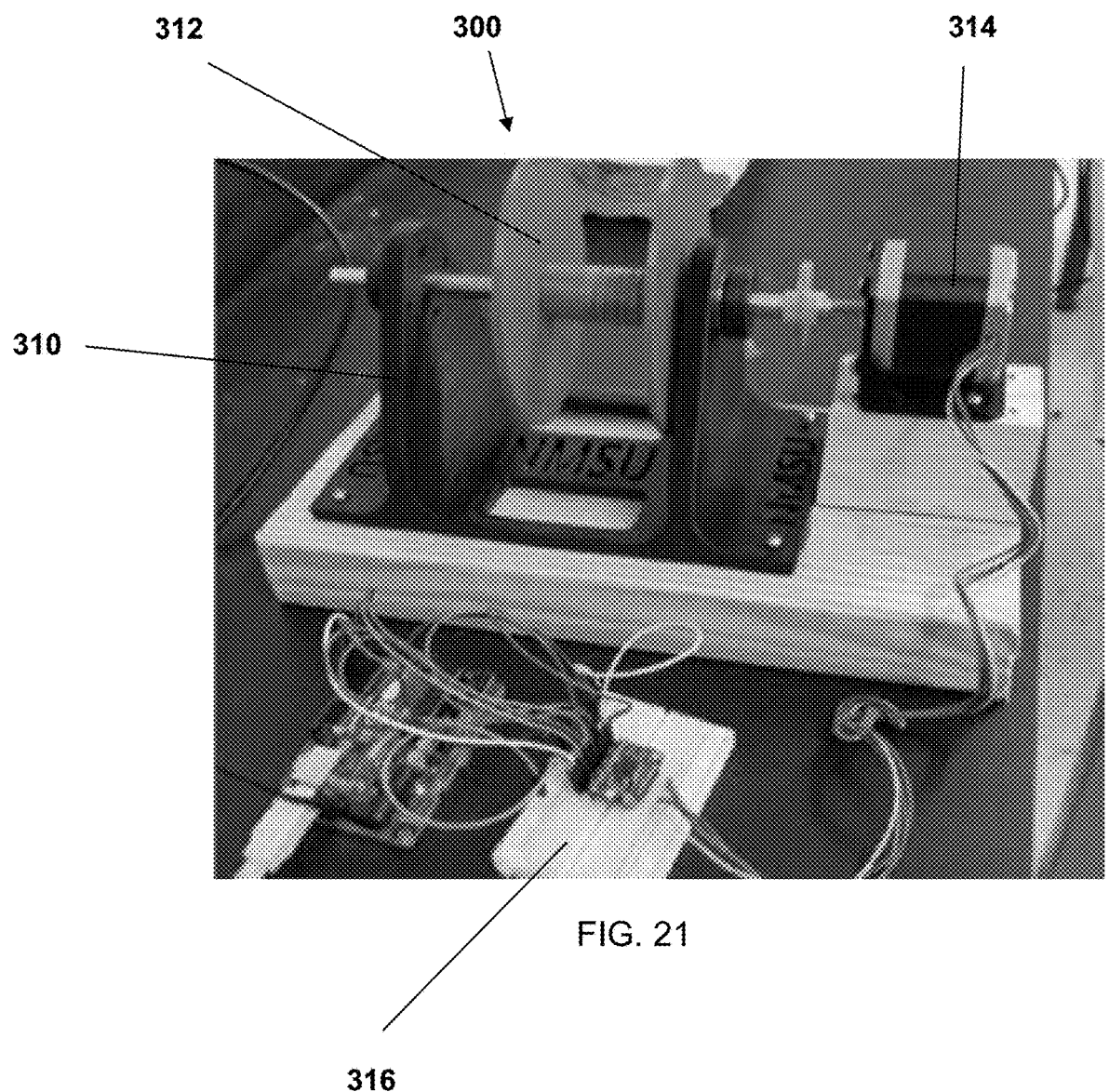
FIG. 21 illustrates a smart winching system for a tether according to an embodiment of the present invention.

Control laws for attitude following and trajectory tracking using Lyapunov-based approaches, for example backstepping and sliding-mode methods, are preferably used. In one embodiment, a winch control model with a constant applied torque and limited tether length can be used. In one embodiment, the system comprises a smart winching system. Referring to FIGS. 19-21, smart winching system 300, comprising motor 314, motor controller 316, reel mount 310, and reel 312, can control reeling of tether 24 based at least in part on desired position of the UAV, attitude of the UAV, velocity, and electrical current of motor 314, which for example can be monitored at motor controller 316. In one embodiment, motor 314 can comprise a stepper motor. In one embodiment, a length of tether 24 can optionally be determined based on one or more of a known number of steps that motor 314 has been instructed to take, a movement of reel 312, and/or by passing tether 24 through or past a sensor that is configured to measure or monitor the amount of length of tether 24 that has passed it. Of course, any other apparatus, system, and/or method which is capable of measuring, monitoring, or estimating the amount of tether that extends between the UAV and the UGV can be used and will provide desirable results.

In one embodiment, the present invention preferably utilizes both the UAV and UGV with different perspectives and integrates the knowledge to generate a local 3D map, for the use in 3D path-planning. The observations from different vehicles can be transformed to a common coordinate frame using computer vision knowledge. Kalman filters can be used to incorporate the sensor measurements into the state estimates. The data fusion techniques can be used to integrate the information collected by both vehicles. The resulting location of THUS with respect to the landmarks after data fusion are thus more accurate than each individual localization result.

Path-planning is an important capability of UVs to navigate because it offers the safe (collision-free) route of combinations of line segments or waypoints that directs the UV from a starting location to its destination. It is the cornerstone of applications, for example search and rescue, border control and the monitoring of infrastructure. The resulting route provides lower-level guidance commands to UVs. While conventional path planning strategies deal with the problem in a two-dimensional planar environment, graph-based approaches can be used to search for the optimal path given geometric constraints.

An embodiment of the present invention relates to a trajectory generator that produces collision-free 3D trajectories for both the aerial and ground vehicles in resource-constrained environments. To plan a collision-free path for THUS, navigating in an obstacle-rich environment, the tether location is preferably taken into account. A 3D path-planning framework is preferably used to find an optimal path for THUS, where the UAV, UGV and tether are considered as a single integrated system. Because the tether position is determined by both the aerial and ground vehicles, this problem becomes a trajectory generation task. The model predictive control (MPC) technique provides a formulation for complex planning problems with different kinds of constraints and can be used in the trajectory generation problem for a large-scale, complex, towed-tether system. In one embodiment, MPC is preferably used to find feasible 3D collision-free paths of THUS with the integration of the spatial constraints in the MPC formulation.

Embodiments of the present invention also provide techniques for THUS to reactively avoid unexpected obstacles. In this embodiment, the trajectory generated by the trajectory generator is a global route for the THUS while reactive obstacle avoidance techniques provide desirable results in applications, for example search and rescue and law enforcement, where unmapped land objects or unexpected mobile objects may pose the potential collision of the THUS. Due to the nature of THUS, the sensing range of each UV is often limited. Therefore, in one embodiment, each vehicle is preferably able to guide the other vehicle in different situations.

The bi-directional guidance preferably comprises a system to manage the switchable leading role between the two vehicles. A behavior-based approach, for example subsumption architecture, is preferably used to achieve this. Sub-behaviors are preferably defined—for example detections of high buildings, doorways and bridges, which are assumed cannot be "seen" by the quadcopter but can be easily perceived by the UGV. The commander's role will be turned over to the UV accordingly when these behaviors are triggered.

After the reactive obstacle avoidance function is triggered, a local obstacle avoidance guidance law is preferably used to maneuver the vehicles. Lyapunov-based approaches are preferably used in this task to develop the local guidance law for obstacle avoidance of THUS. The geometric constraints of obstacles are preferably taken into consideration in the control objective so that the tether position is considered.

In one embodiment, the heterogeneous system can operate in an environment with low pathways and ground obstacles. There will be times when the UAV is not able to detect low pathways, through which the UGV needs to guide the UAV. While operating in a relatively open environment, the UAV guides the UGV to avoid obstacles based on a local map. Path-planning algorithms for cooperative guidance of heterogeneous UVs are preferably used to combine the advantages of the sensing capabilities of both the UGV and the UAV.

Figure 24:
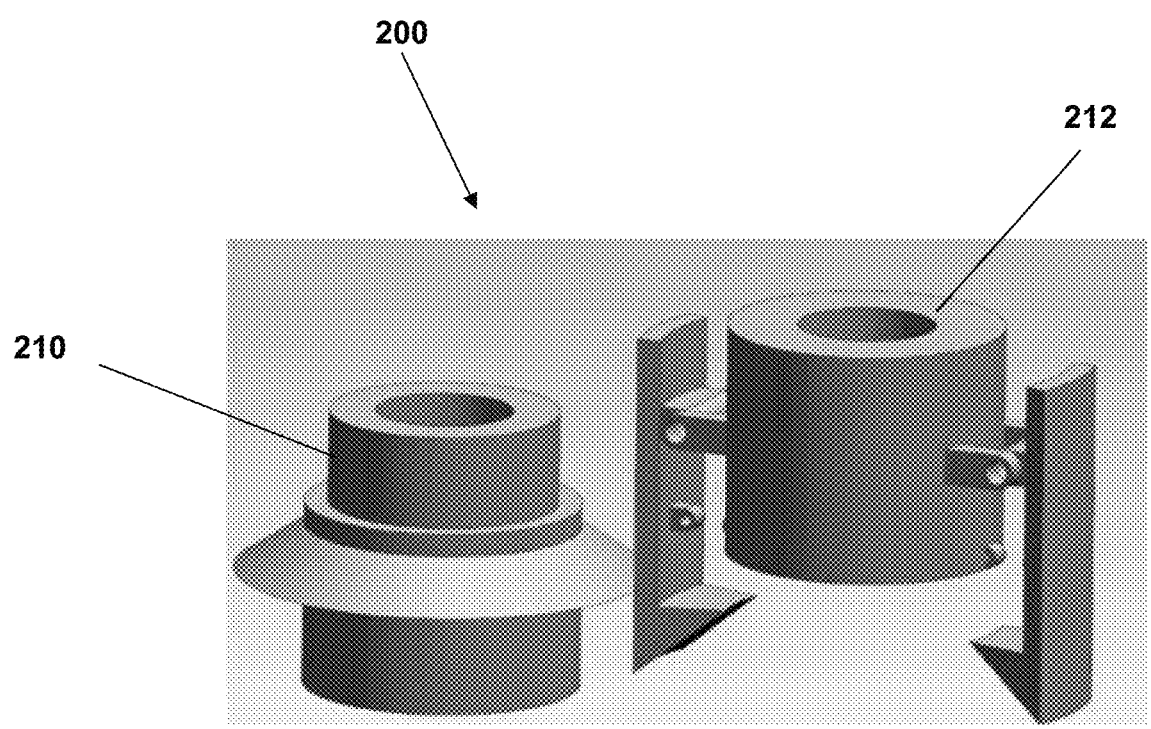
FIGS. 24 and 25 are drawings that respectively illustrate a rapid tether coupling/decoupling system of an embodiment of the present invention in a decoupled (FIG. 24) and a coupled (FIG. 25) configuration.
Figure 25:
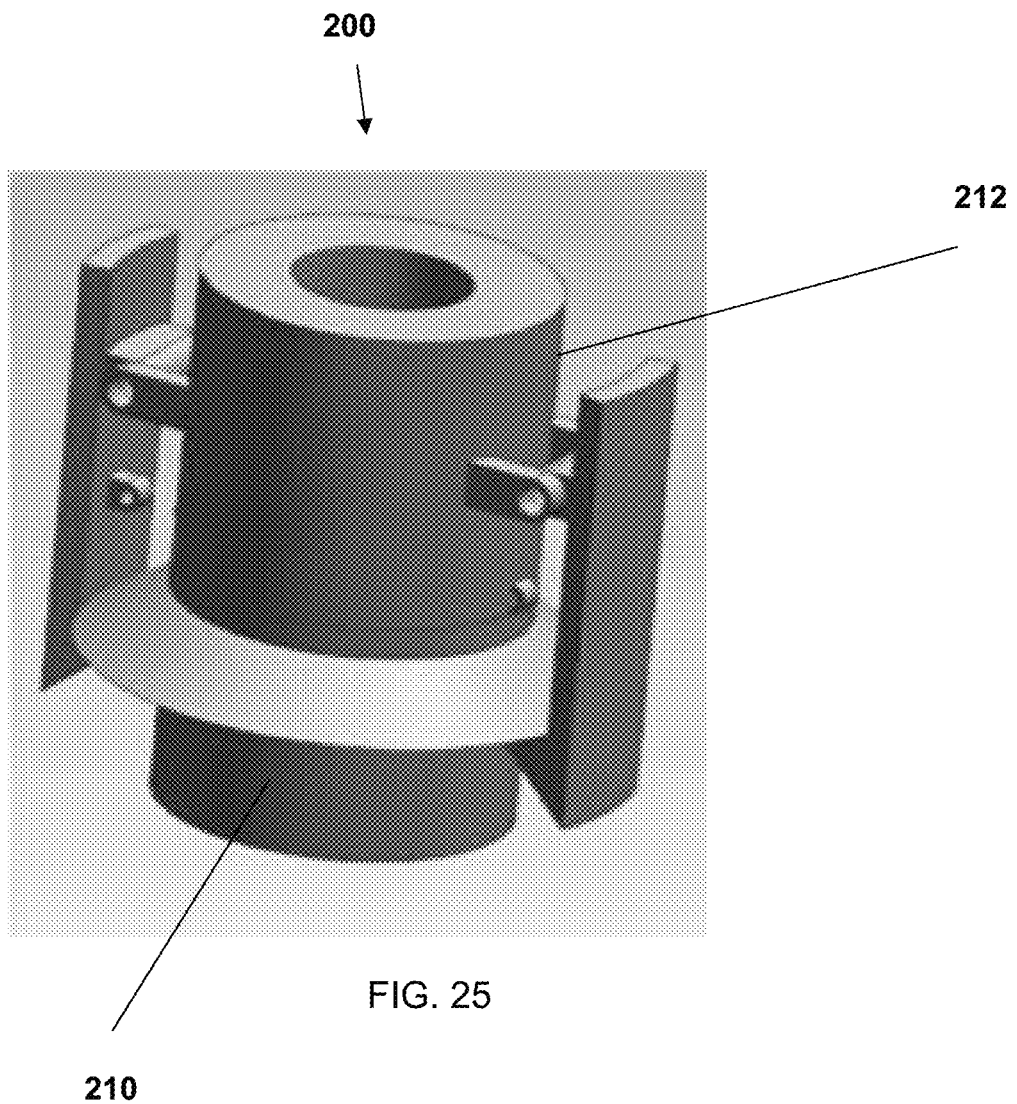

In one embodiment, a heterogeneous system further comprises a rapid decoupling and/or coupling system. Referring to FIGS. 24-25, in one embodiment, mechatronic unit 200 is installed, for example, on a bottom or lower portion of the UAV and is used to disconnect the tether in mid-air and reconnect the tether on, for example, a landing platform. In one embodiment, the system provides the UAV with a highly flexible capability in transition between tasks, for example from surveillance to a chasing/tracking task. In one embodiment, instead of being coupled to a UGV, the UAV can instead be coupled to a stationary platform. In this embodiment, multiple stationary platforms can be deployed to provide a relay for a UAV to perform persistent (short-distance and/or long-distance) missions without returning to the base. In this embodiment, the UAV can couple to a first UGV or a first base, transmit data and/or recharge the UAV batteries, and then travel to another stationary base or UGV. As such, a UAV can hop from location to location and thus persist for long durations and/or travel long distances while remaining constantly in the air. In one embodiment, mechatronic unit 200 is configured to couple connectors 210 and 212, for example, electromagnetically. For example, a UAV can hover such that connector 210, communicably coupled to the UAV, is located directly above connector 212, connected to an end of a tether that itself is connected to a UGV or a stationary platform. The UAV can then activate an electromagnet in mechatronic unit 200 thus connecting the UAV to a tether of a UGV or a stationary platform and thereby permitting the UAV to charge its internal battery, provide electrical power to permit the UAV to remain airborne, and/or transmit data to and/or from the UAV and provide the ability for auto repair and/or a propeller change.

Industrial Applicability

The invention is further illustrated by the following non-limiting examples. Embodiments of the present invention have been verified in both computer-aided design (CAD) software simulations as well as hardware experiments. The results show the effectiveness and accuracy of embodiments of the present invention.

Example 1

A quadcopter with a cable attached to its center of mass was evaluated. With this setup, the tether tension vector (with a constant magnitude) only affected the forces exerted on the quadcopter. The equations of motions for the quadcopter were modified in the external forces by adding the tether tension vector components in the equations. The cable tension amplitude was assumed to be constant and selected as 1 N. The equations of motion, as described previously, were implemented in a computer simulation. Also, the accelerometer mathematical model presented in equations 20-22 was used with simulated white Gaussian noise replicating the actual expected noise that could be picked up from the actual inertial measurement unit (IMU) on board the quadcopter.

Figure 4:
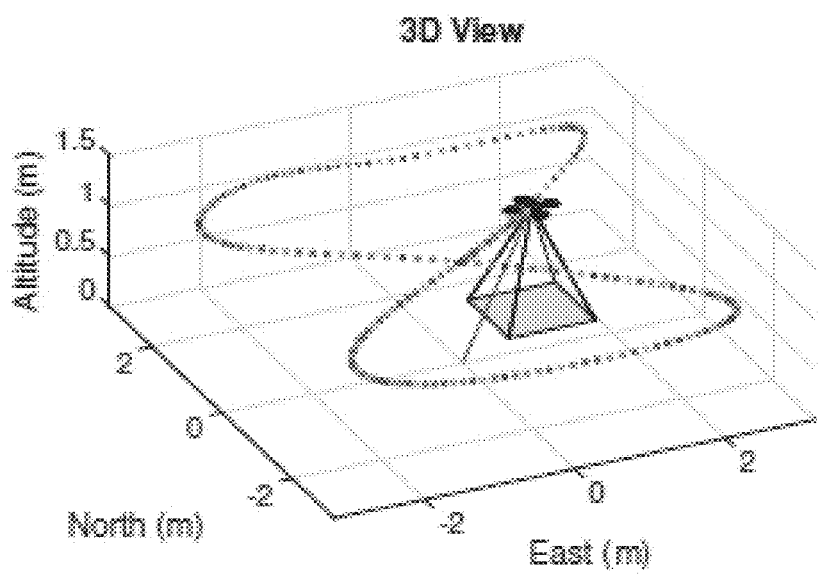
FIG. 4 is a diagram illustrating a tethered quadcopter following a three-dimensional hourglass trajectory.

The quadcopter was commanded to follow an hourglass trajectory, as shown in FIG. 4. This was accomplished with a trajectory-tracking control law based on a backstepping approach that commanded the quadcopter to follow a figure-8 shape orbit. The simulation result is illustrated in FIG. 4. The solid line extending from point 0,0 on the grid up to the quadcopter denotes the tether. The textured square, illustrated below the quadcopter, represents the field-of-view of the camera, and the colored dots indicate the travel history of the quadcopter. The result showed that the developed Lyapunov control law drove the quadcopter successfully and followed the desired trajectory.

Figure 5:
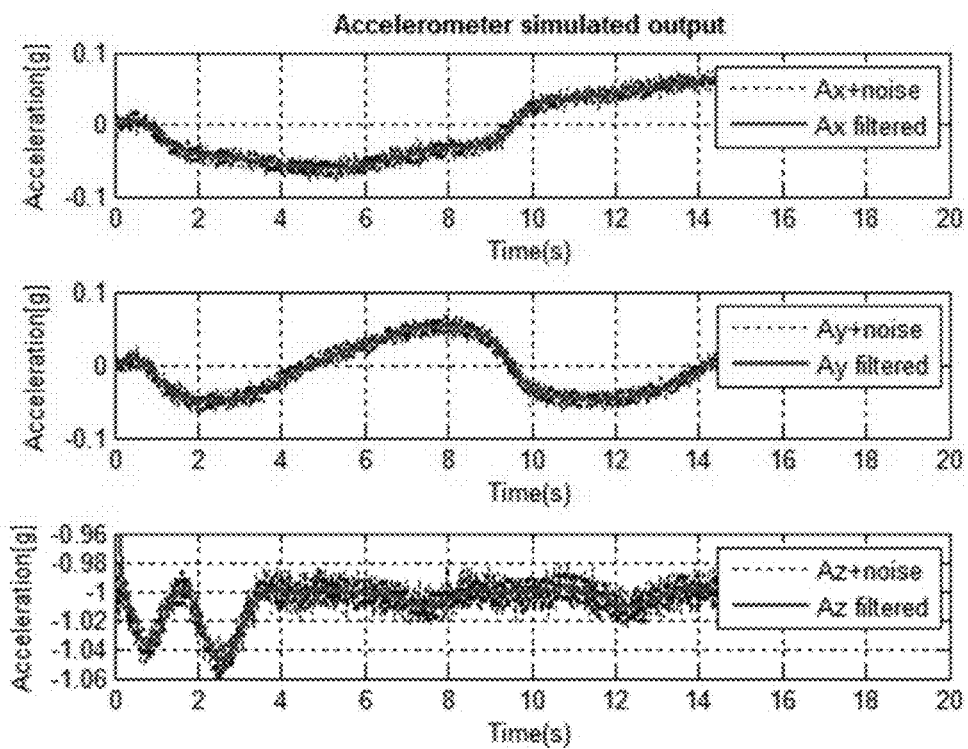
FIG. 5 is a drawing of three charts which respectively illustrate results obtained from each axis of a 3-axis accelerometer with white Gaussian noise.

The unit of the quadcopter acceleration measurements was converted from $m/s^2$ to g in order to match the real output of the accelerometer on quadcopters. FIG. 5 illustrates the overlapped noisy and filtered (by a Butterworth low-pass filter) data measured by a 3-axis accelerometer.

Figure 6:
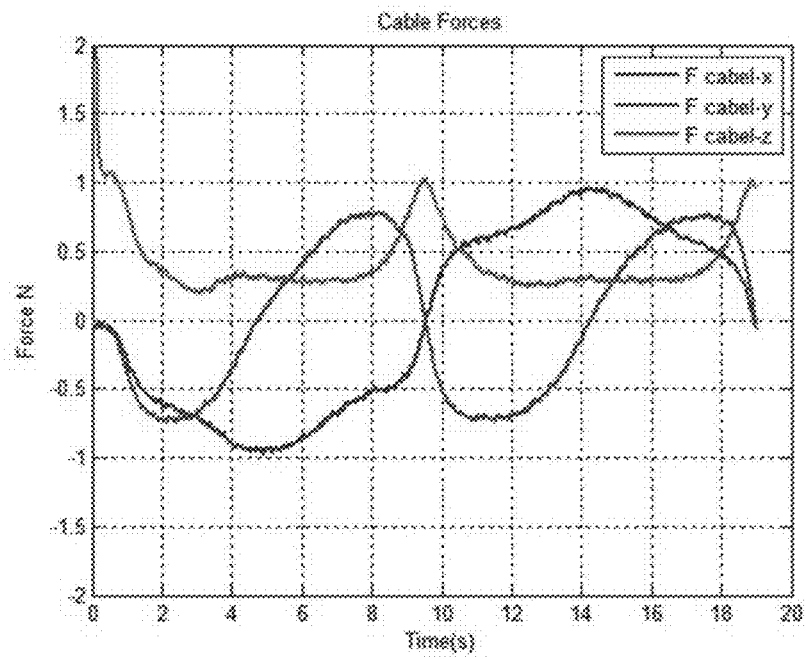
FIG. 6 is a graph illustrating cable forces measured in a simulation of an embodiment of the present invention.

The tension force vector was estimated using the accelerometer output and the motor thrusts, which were calculated using the PWM signal commands to the motors as well as the Euler angles measured by gyroscopes. The obtained 3D cable forces are illustrated in FIG. 6.

Figure 7:
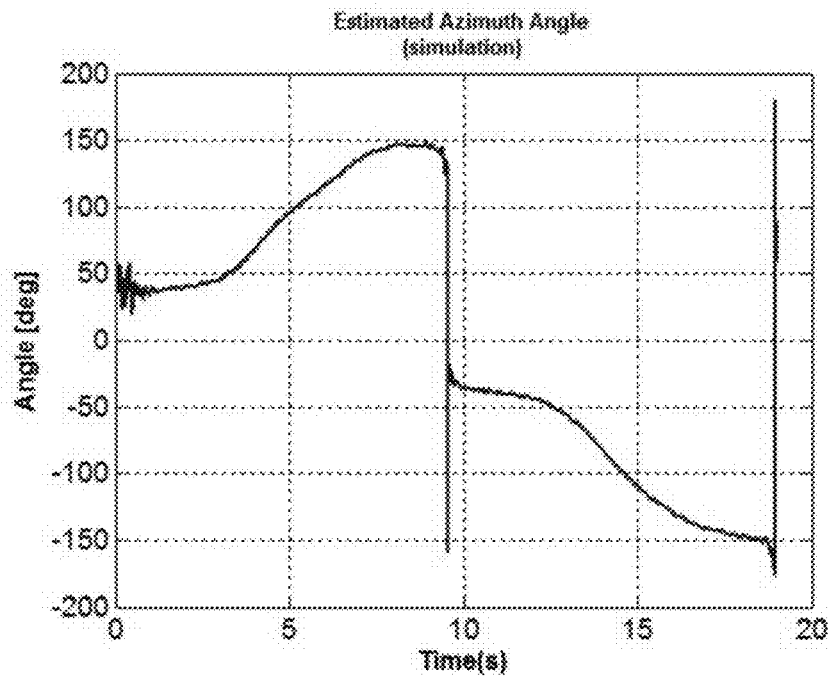
FIGS. 7 and 8 respectively illustrate graphs depicting estimated azimuth angle and estimated elevation angle in a simulation of an embodiment of the present invention.
Figure 8:
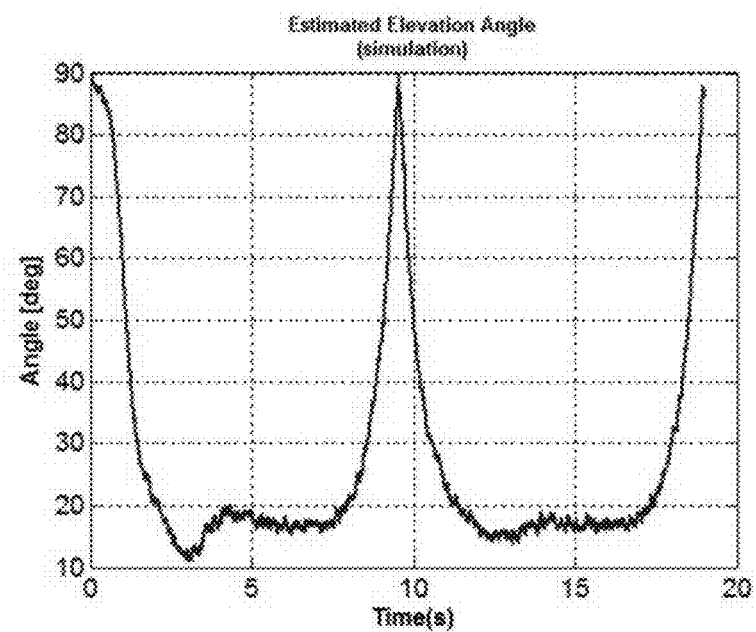
Figure 9:
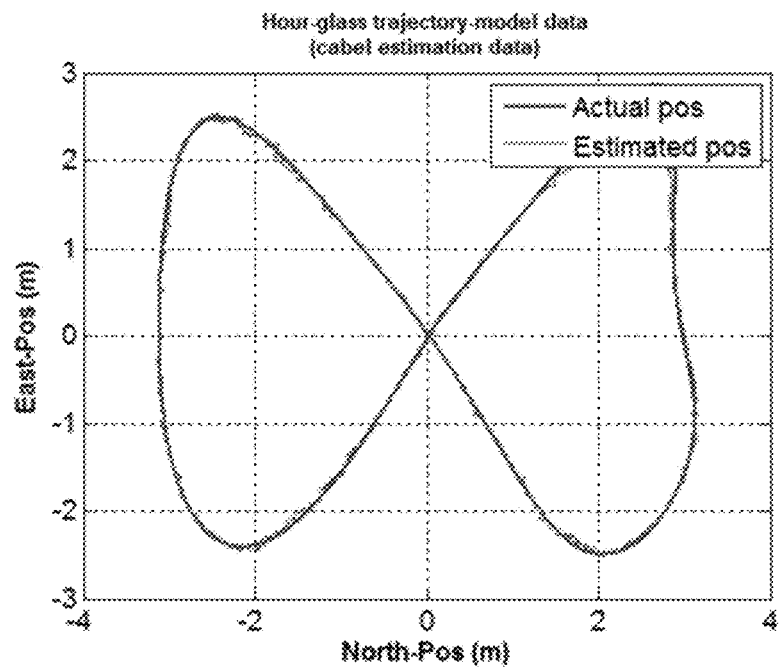
FIG. 9 is a graph illustrating estimated and actual trajectory of a tethered quadcopter in a simulation of an embodiment of the present invention.
Figure 10:
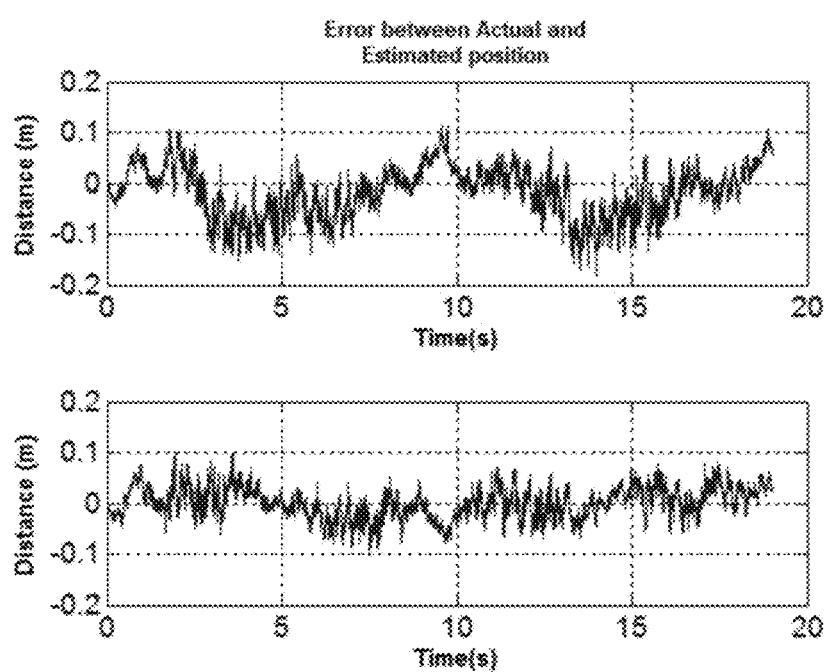
FIG. 10 is a graph illustrating error between the actual and estimated positions of a tethered quadcopter according to an embodiment of the present invention.

The azimuth and elevation angles of the cable were calculated using equations (27) and (28). FIGS. 7 and 8 show the estimated angles. Using equations (29)-(31), the estimated position of the quadcopter was obtained and compared with the actual position, as illustrated in FIG. 9. FIG. 10 shows the error in position estimation in North and East directions, respectively. As can be seen, embodiments of the present invention provide accurate estimation of the position of the quadcopter with respect to the ground vehicle.

Example 2

Figure 11:
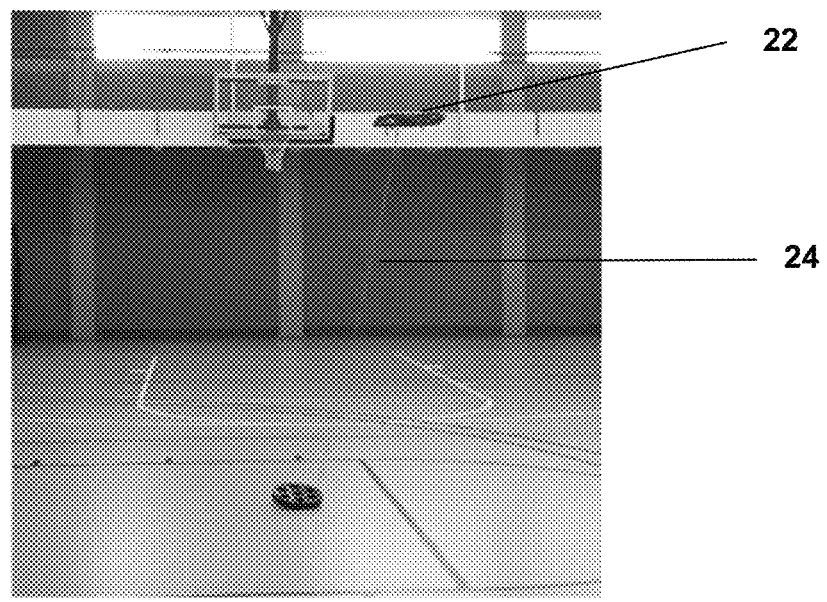
FIG. 11 is a photograph illustrating a quadcopter platform according to an embodiment of the present invention in flight testing.

Indoor flight tests of an embodiment of the present invention were conducted. The quadcopter setup shown in FIG. 19 was used in this experiment. Table I illustrates a list of parameters of the quadcopter. The tethered quadcopter platform that was used is illustrated in FIG. 11. A thin and light fishing line was used as the cable.

TABLE 1

Parrot AR Drone 2.0 Parameters

| Parameters | Value |
| --- | --- |
| Mass (m) | 0.429 kg |
| Moment of inertia, x-axis ($J_x$) | 0.00224 $Kg.m^2$ |
| Moment of inertia, y-axis ($J_y$) | 0.00299 $Kg.m^2$ |
| Moment of inertia, z-axis ($J_z$) | 0.0048 $Kg.m^2$ |
| Moment of inertia, spin axis ($J_r$) | 2.03E-5 $Kg.m^2$ |
| Distance from rotor center to center of mass (L) | 0.1785 m |

The quadcopter was controlled through a robot operating system (ROS). After takeoff, the quadcopter increased its altitude to make the cable taut so that the cable tension force was exerted on the quadcopter. The quadcopter was then commanded to move forward by flying against the fixed location of the other end of the cable on the ground, resulting in an elevation angle of less than 90 degrees. During the test flight, it was observed that the tethered quadcopter had much less drifting and the existing autopilot had certain capability to stabilize the vehicle with the tether attached. However, the quadcopter did not follow the control commands without modification on the autopilot systems. In the preliminary results, the UAV acted as an eye in the sky, providing the UGV with an aerial perspective of the environment. The perspective allows the UAV to identify the locations of obstacles the UGV may encounter, enabling the UGV to follow a collision-free path. The effectiveness of the UGV guidance that directs the UAV to pass a narrow passageway was also demonstrated as well as the necessity and effectiveness of the bi-directional cooperation of heterogeneous UVs.

Figure 12:
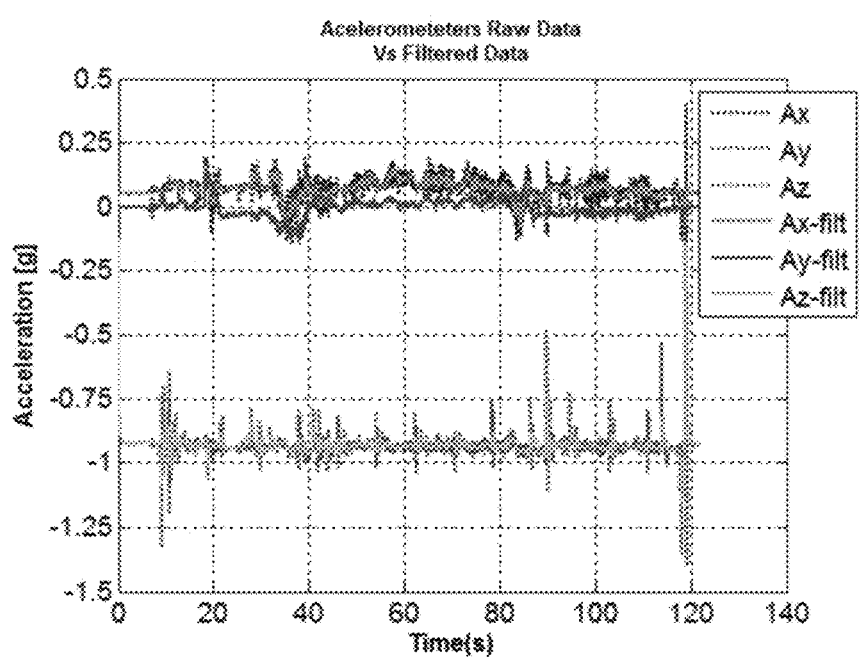
FIG. 12 is a chart illustrating raw and filtered accelerometer data from flight testing according to an embodiment of the present invention.
Figure 13:
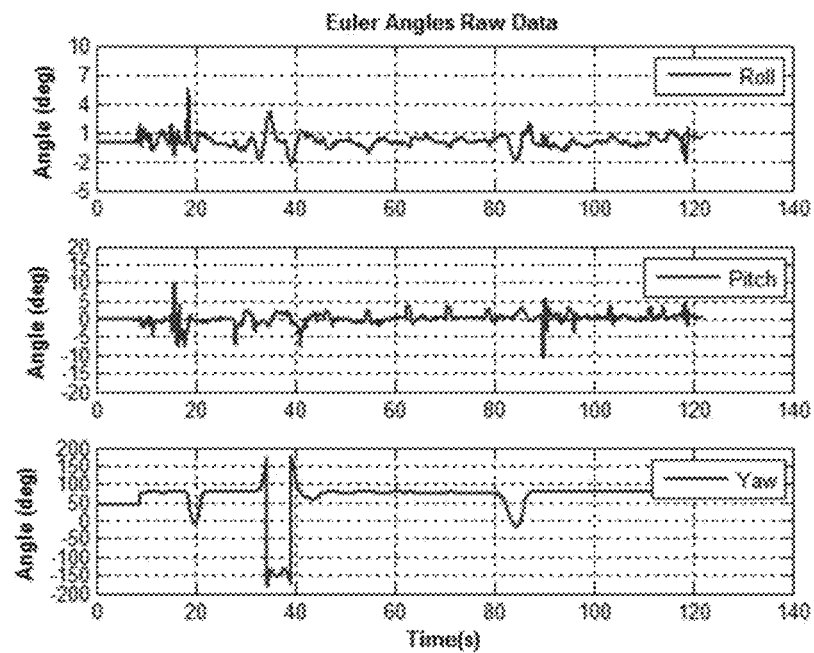
FIG. 13 is a graph which illustrates raw data of Euler angles from flight testing of an embodiment of the present invention.
Figure 14:
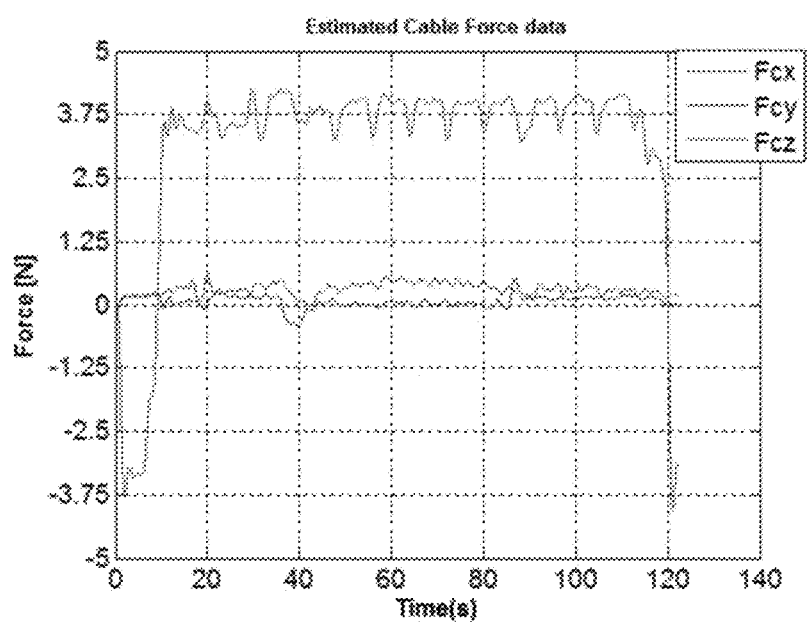
FIGS. 14, 15, 16, and 17 are graphs which respectively illustrate estimated cable forces, estimated thrust forces, estimated azimuth angle, and estimated elevation angle in a flight test of an embodiment of the present invention.
Figure 15:
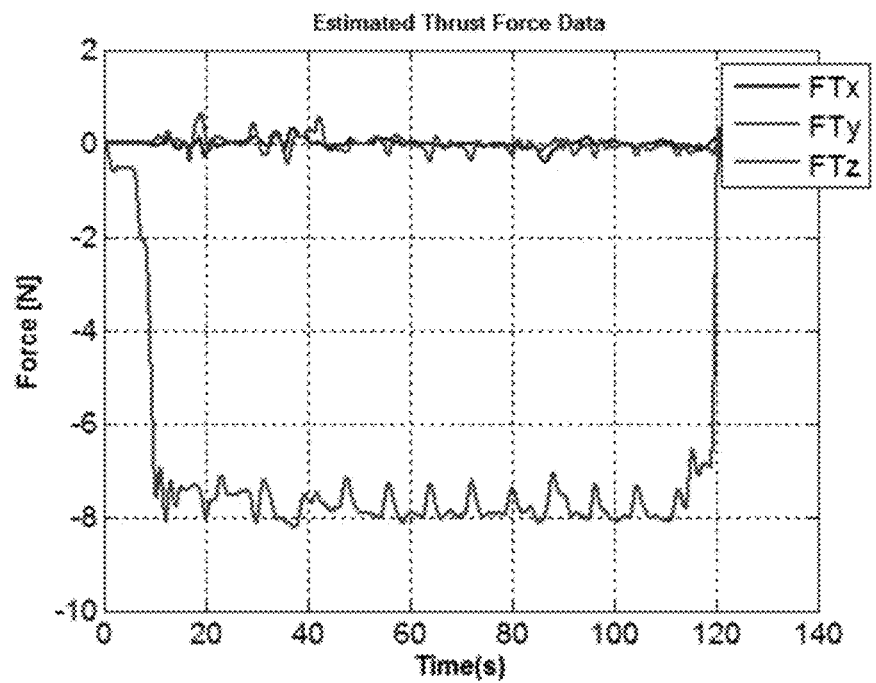
Figure 16:
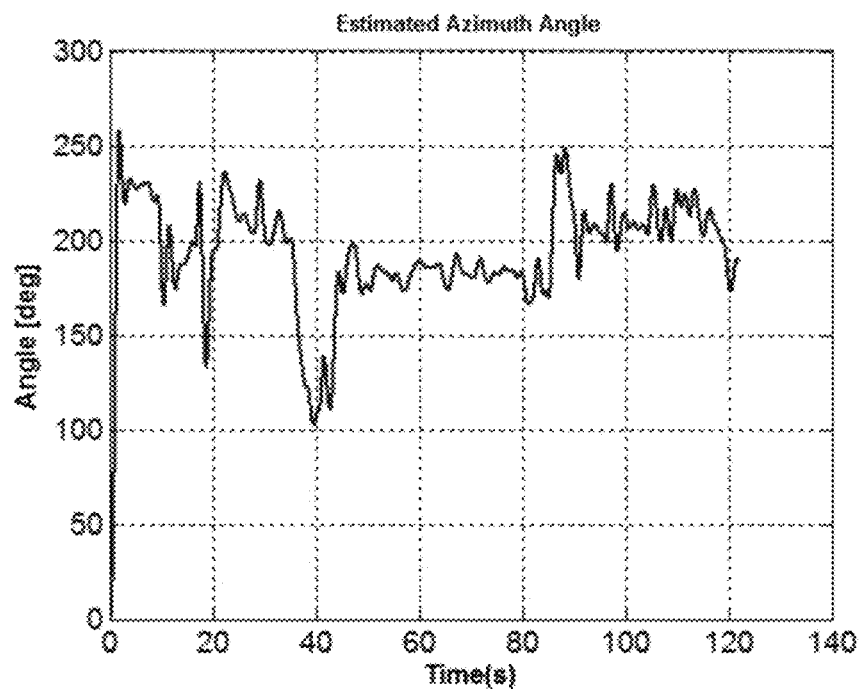
Figure 17:
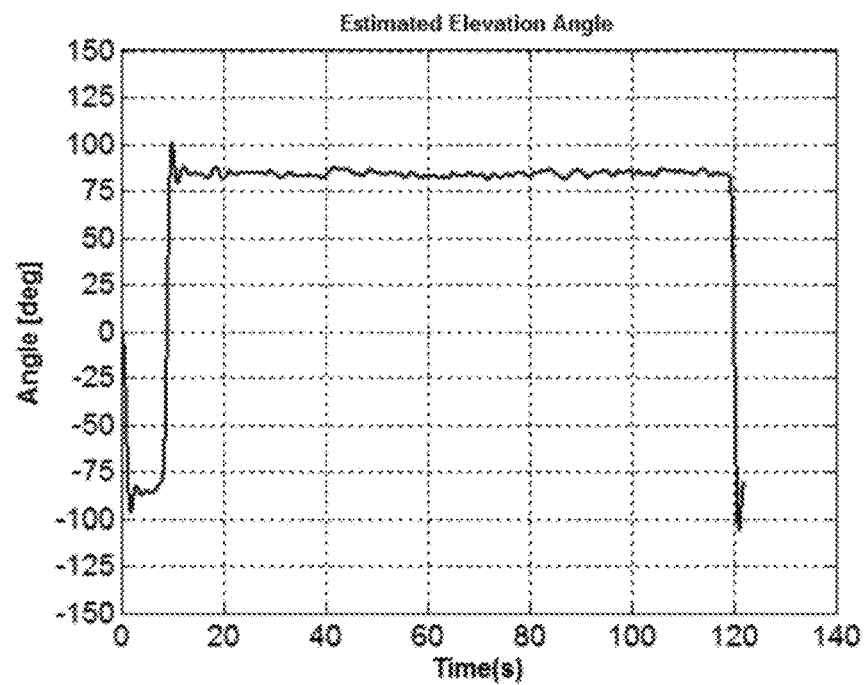

A Butterworth low-pass filter was performed on the raw data before using them in estimation. The raw and filtered accelerometer data (in the body frame $\mathscr{F}^b$) are illustrated in FIG. 12. The measured Euler angles (roll, pitch and yaw) are illustrated in FIG. 13. All raw data were fed into the estimation algorithm as previously discussed. The results showed a significant match of the estimated cable angles with the actual ones observed in the flight test. In FIG. 14, the forces exerted by the cable on the quadcopter are illustrated in three axes in the vehicle frame $\mathscr{F}^u$, while FIG. 15 illustrates the thrust force of the quadcopter motors in the vehicle frame $\mathscr{F}^u$. The estimated azimuth angle of the cable is illustrated in FIG. 16, where the variation from 200 to 100 degrees corresponds to the rotation of the quadcopter around the base of the cable. FIG. 17 illustrates the estimated elevation angle whose average value was approximately 83 degrees after takeoff, which is a good match of the cable elevation in the flight test.

The preceding examples can be repeated with similar success by substituting the generically or specifically described components and/or operating conditions of embodiments of the present invention for those used in the preceding examples.

Optionally, embodiments of the present invention can include a general or specific purpose computer or distributed system programmed with computer software implementing the steps described above, which computer software may be in any appropriate computer language, including but not limited to C++, FORTRAN, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated by reference.

What is claimed is:
1. An unmanned aerial vehicle system comprising:
an unmanned ground vehicle (UGV);

a sensing unmanned aerial vehicle (UAV);

a tether configured to couple said UAV and said UGV; said tether configured to transmit data from said UAV to said UGV;

a collision protection system configured to use the transmitted data to facilitate a collision-free path for said UGV, said UAV, and said tether; and a tether position sensing system.

2. The unmanned aerial vehicle system of claim 1 wherein said tether is taut while said UGV and said UAV are connected with said tether.

3. The unmanned aerial vehicle system of claim 1 wherein said tether position sensing system comprises a sensor configured to measure an angle formed between said tether and said UGV.

4. The unmanned aerial vehicle system of claim 3 wherein said tether position sensing system is configured to determine a position of said UAV with respect to said UGV based at least in part on a length of said tether and on an output of said sensor.

5. The unmanned aerial vehicle system of claim 1 wherein said tether is configured to function as a secure data link between said UGV and said UAV.

6. The unmanned aerial vehicle system of claim 1 wherein said tether is configured to provide power to said UAV.

7. The unmanned aerial vehicle system of claim 1 wherein said UVA comprises a vertical takeoff and landing (VTOL) aircraft.

8. The unmanned aerial vehicle system of claim 1 wherein said UGV further comprises a landing platform.

9. The unmanned aerial vehicle system of claim 1 further comprising an electromagnetic rapid coupling system.

10. The unmanned aerial vehicle system of claim 1 wherein said UGV further comprises a smart winching system configured to provide controllable reeling of said tether.

11. The unmanned aerial vehicle system of claim 10 wherein said reeling is controlled based at least in part on current and desired position.

12. The unmanned aerial vehicle system of claim 11 wherein said reeling is further controlled based at least in part on velocity and attitude of said UAV.

13. An unmanned aerial vehicle system comprising:

a station, said station comprising one or more of an unmanned ground vehicle (UGV) and a stationary station;

an unmanned aerial vehicle (UAV);

a tether configured to couple said UAV and said station and configured to transmit at least one of power and data;

a collision protection system configured to use the transmitted data to facilitate a collision-free path for said unmanned aerial vehicle system and which takes into consideration said tether; and a tether position sensing system configured to sense at least an angular position of said tether with respect to said station.

14. The unmanned aerial vehicle system of claim 13 wherein said tether position sensing system is configured to determine a position of said UAV with respect to said station based at least in part on a length of said tether and on the angular position of said tether with respect to said station.

15. The unmanned aerial vehicle system of claim 13 wherein said UAV comprises a vertical takeoff and landing aircraft.

16. The unmanned aerial vehicle system of claim 13 further comprising an electromagnetic rapid coupling system.

17. The unmanned aerial vehicle system of claim 13 wherein said station further comprises a smart winching system configured to provide controllable reeling of said tether.

18. The unmanned aerial vehicle system of claim 17 wherein said smart winching system is configured to monitor a length of tether extending between said station and said UAV.

* * * * *